United States Patent
LeCrone et al.

(10) Patent No.: US 9,990,137 B1
(45) Date of Patent: Jun. 5, 2018

(54) I/O OPTIMIZATION

(71) Applicant: EMC Corporation, Hopkinton, MA (US)

(72) Inventors: Douglas E. LeCrone, Hopkinton, MA (US); Paul Linstead, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days. days.

(21) Appl. No.: 14/674,617

(22) Filed: Mar. 31, 2015

(51) Int. Cl.
*G06F 3/06* (2006.01)

(52) U.S. Cl.
CPC ............ *G06F 3/061* (2013.01); *G06F 3/0601* (2013.01); *G06F 3/067* (2013.01); *G06F 3/0659* (2013.01); *G06F 2003/0697* (2013.01)

(58) Field of Classification Search
CPC . G06F 2003/0697; G06F 3/0601; G06F 3/061
USPC ............................................................ 710/6
See application file for complete search history.

(56) References Cited

U.S. PATENT DOCUMENTS

2003/0140183 A1* 7/2003 Goode .................. G06F 3/0601
710/6

* cited by examiner

*Primary Examiner* — Ernest Unelus
(74) *Attorney, Agent, or Firm* — Muirhead and Saturnelli, LLC (57) ABSTRACT

Providing I/O operations to a storage device includes selecting a portion of original I/O operations based on a first set of criteria, determining whether to subdivide each of the portion of original I/O operations that are selected according to a second set of criteria different than the first set of criteria, and converting each of the original I/O operations selected for subdivision into a plurality of subdivided I/O operations for different portions of data for a corresponding one of the original I/O operations. The first set of criteria may include whether the I/O operations are for multiple tracks of data. The second set of criteria may include determining a measured amount of performance improvement for previous subdivision operations. Performance of subdivided I/O operations may be monitored. A number of subdivided I/O operations may be limited by a number of available parallel I/O routes.

17 Claims, 6 Drawing Sheets

I/O OPTIMIZATION

TECHNICAL FIELD

This application relates to the field of computer systems and storage devices therefor and, more particularly, to the field of storage access and I/O operations among computing systems and storage devices.

BACKGROUND OF THE INVENTION

Host processor systems may store and retrieve data using a storage device containing a plurality of host interface units (I/O modules), disk drives, and disk interface units (disk adapters). The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

Although processors used to provide such storage devices have become faster over the years, much of the recent improvement in processor technology has been the result of providing multiple cores, which allows multiple threads to be executed simultaneously. Core with multiple processors facilitate processing performed in connection with a storage I/O device, since many different I/O operations from different hosts and possibly even different applications on each host are provided in parallel to the storage device. However, some application perform I/O operations that read and write large amounts of data per operation (e.g., a single read operation that reads one hundred tracks of data). A single read or write operation for a relatively large amount of data does not take advantage of parallel processing capabilities in storage devices or in connections between hosts and storage devices and drivers therefor. However, in instances where an application writer is aware of the possibility of performing parallel I/O operations for relatively small amounts of data, in many cases underlying drivers on a host that are not controlled by the application writer may automatically buffer data and cause multiple contiguous I/O operations to be presented to a storage device as a single I/O operation for a relatively large amount of data, thus negating any efforts by an application writer to take advantage of parallel I/O operation capabilities in a system. Note also that, in many instances, it may not be possible or practical to rewrite applications that run on hosts anyway.

Accordingly, it is desirable to provide a mechanism that takes advantage of parallel I/O capabilities in a system without the need to make adjustments to applications that run on hosts even when the applications perform I/O operations for relatively large amounts of data.

SUMMARY OF THE INVENTION

According to the system described herein, providing I/O operations to a storage device includes selecting a portion of original I/O operations based on a first set of criteria, determining whether to subdivide each of the portion of original I/O operations that are selected according to a second set of criteria different than the first set of criteria, and converting each of the original I/O operations selected for subdivision into a plurality of subdivided I/O operations for different portions of data for a corresponding one of the original I/O operations. The first set of criteria may include whether the I/O operations are for multiple tracks of data. The second set of criteria may include determining a measured amount of performance improvement for previous subdivision operations. Performance of subdivided I/O operations may be monitored. A number of subdivided I/O operations may be limited by a number of available parallel I/O routes. I/O operations may be subdivided following an exit by I/O driver routines. Results of the subdivided I/O operations may be reassembled to provide a result to the I/O driver routines. An original I/O operation may be subdivided according to different tracks, each corresponding subdivided I/O operation being for a particular one of the tracks. A subdivided I/O operation may be prevented from being further subdivided. Providing I/O operations to a storage device may also include using a planning tool to predict an effect of subdividing I/O operations.

According further to the system described herein, a non-transitory computer-readable medium contains software that provides I/O operations to a storage device. The software includes executable code that selects a portion of original I/O operations based on a first set of criteria, executable code that determines whether to subdivide each of the portion of original I/O operations that are selected according to a second set of criteria different than the first set of criteria, and executable code that converts each of the original I/O operations selected for subdivision into a plurality of subdivided I/O operations for different portions of data for a corresponding one of the original I/O operations. The first set of criteria may include whether the I/O operations are for multiple tracks of data. The second set of criteria may include determining a measured amount of performance improvement for previous subdivision operations. Performance of subdivided I/O operations may be monitored. A number of subdivided I/O operations may be limited by a number of available parallel I/O routes. I/O operations may be subdivided following an exit by I/O driver routines. Results of the subdivided I/O operations may be reassembled to provide a result to the I/O driver routines. An original I/O operation may be subdivided according to different tracks, each corresponding subdivided I/O operation being for a particular one of the tracks. A subdivided I/O operation may be prevented from being further subdivided.

BRIEF DESCRIPTION OF THE DRAWINGS

Embodiments of the system are described with reference to the several figures of the drawings, noted as follows.

DETAILED DESCRIPTION OF VARIOUS EMBODIMENTS

Figure 1:
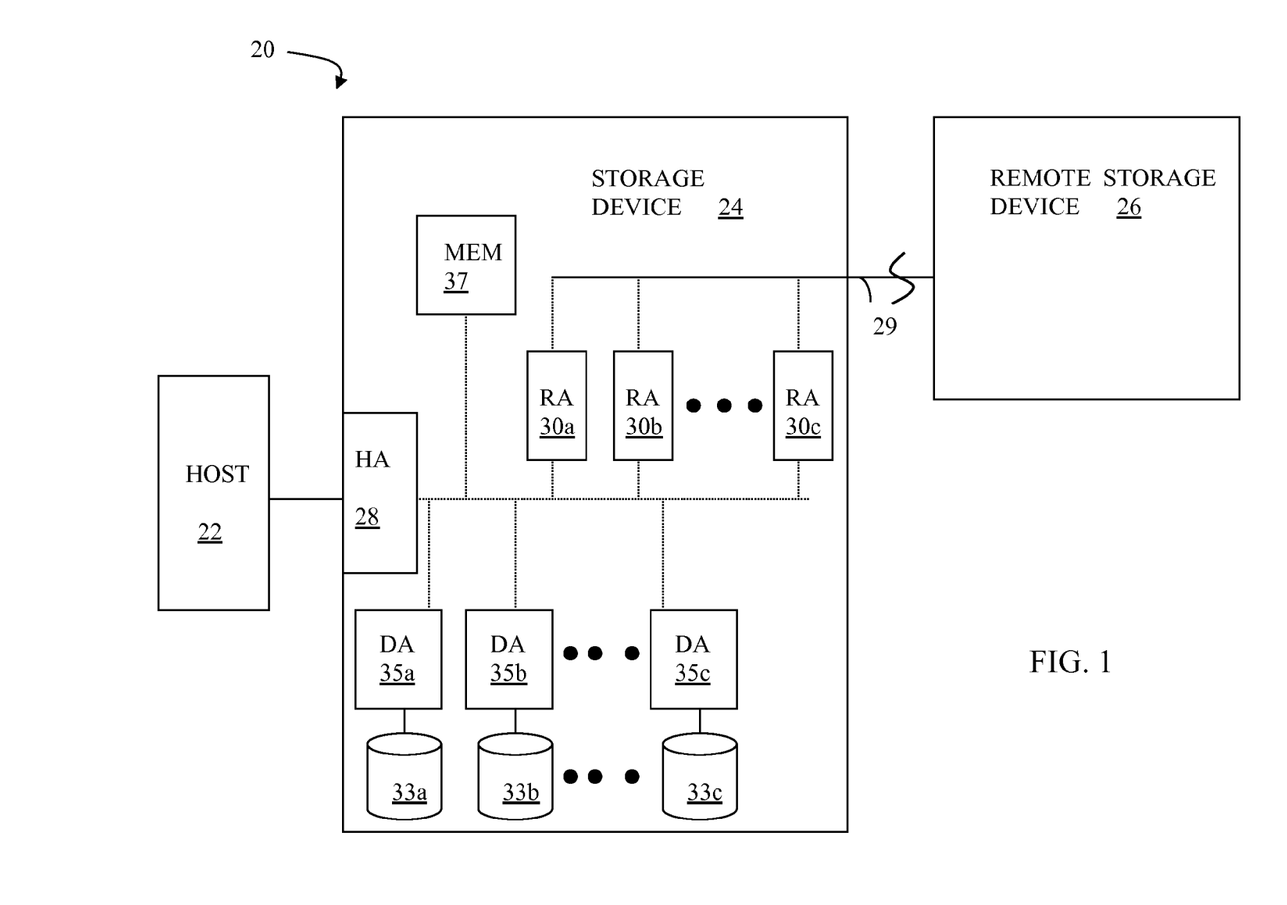
FIG. 1 is a schematic illustration of a storage system showing a relationship between a host and a storage device that may be used in connection with an embodiment of the system described herein.

FIG. 1 is a schematic illustration of a storage system 20 showing a relationship between a host 22 and a storage device 24 that may be used in connection with an embodiment of the system described herein. In an embodiment, the storage device 24 may be a Symmetrix storage system produced by EMC Corporation of Hopkinton, Mass.; however, the system described herein may operate with other appropriate types of storage devices. Also illustrated is another (remote) storage device 26 that may be similar to, or different from, the storage device 24 and may, in various embodiments, be coupled to the storage device 24, for example, via a network. The host 22 reads and writes data from and to the storage device 24 via an HA 28 (host adapter), which facilitates an interface between the host 22 and the storage device 24. Although the diagram 20 only shows one host 22 and one HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage device 24 may be copied to the remote storage device 26 via a link 29. For example, the transfer of data may be part of a data mirroring or replication process, that causes data on the remote storage device 26 to be identical to the data on the storage device 24. Although only the one link 29 is shown, it is possible to have additional links between the storage devices 24, 26 and to have links between one or both of the storage devices 24, 26 and other storage devices (not shown). The storage device 24 may include a first plurality of adapter units (RA's) 30a, 30b, 30c. The RA's 30a-30c may be coupled to the link 29 and be similar to the HA 28, but are used to transfer data between the storage devices 24, 26.

The storage device 24 may include one or more disks (including solid state storage), each containing a different portion of data stored on each of the storage device 24. FIG. 1 shows the storage device 24 having a plurality of disks 33a, 33b, 33c. The storage device (and/or remote storage device 26) may be provided as a stand-alone device coupled to the host 22 as shown in FIG. 1 or, alternatively, the storage device 24 (and/or remote storage device 26) may be part of a storage area network (SAN) that includes a plurality of other storage devices as well as routers, network connections, etc. (not shown). The storage devices may be coupled to a SAN fabric and/or be part of a SAN fabric. The system described herein may be implemented using software, hardware, and/or a combination of software and hardware where software may be stored in a computer readable medium and executed by one or more processors.

Each of the disks 33a-33c may be coupled to a corresponding disk adapter unit (DA) 35a, 35b, 35c that provides data to a corresponding one of the disks 33a-33c and receives data from a corresponding one of the disks 33a-33c. An internal data path exists between the DA's 35a-35c, the HA 28 and the RA's 30a-30c of the storage device 24. Note that, in other embodiments, it is possible for more than one disk to be serviced by a DA and that it is possible for more than one DA to service a disk. The storage device 24 may also include a global memory 37 that may be used to facilitate data transferred between the DA's 35a-35c, the HA 28 and the RA's 30a-30c. The memory 37 may contain tasks that are to be performed by one or more of the DA's 35a-35c, the HA 28 and/or the RA's 30a-30c, and may contain a cache for data fetched from one or more of the disks 33a-33c.

The storage space in the storage device 24 that corresponds to the disks 33a-33c may be subdivided into a plurality of volumes or logical devices. The logical devices may or may not correspond to the physical storage space of the disks 33a-33c. Thus, for example, the disk 33a may contain a plurality of logical devices or, alternatively, a single logical device could span both of the disks 33a, 33b. Similarly, the storage space for the remote storage device 26 may be subdivided into a plurality of volumes or logical devices, where each of the logical devices may or may not correspond to one or more disks of the remote storage device 26.

Figure 2:
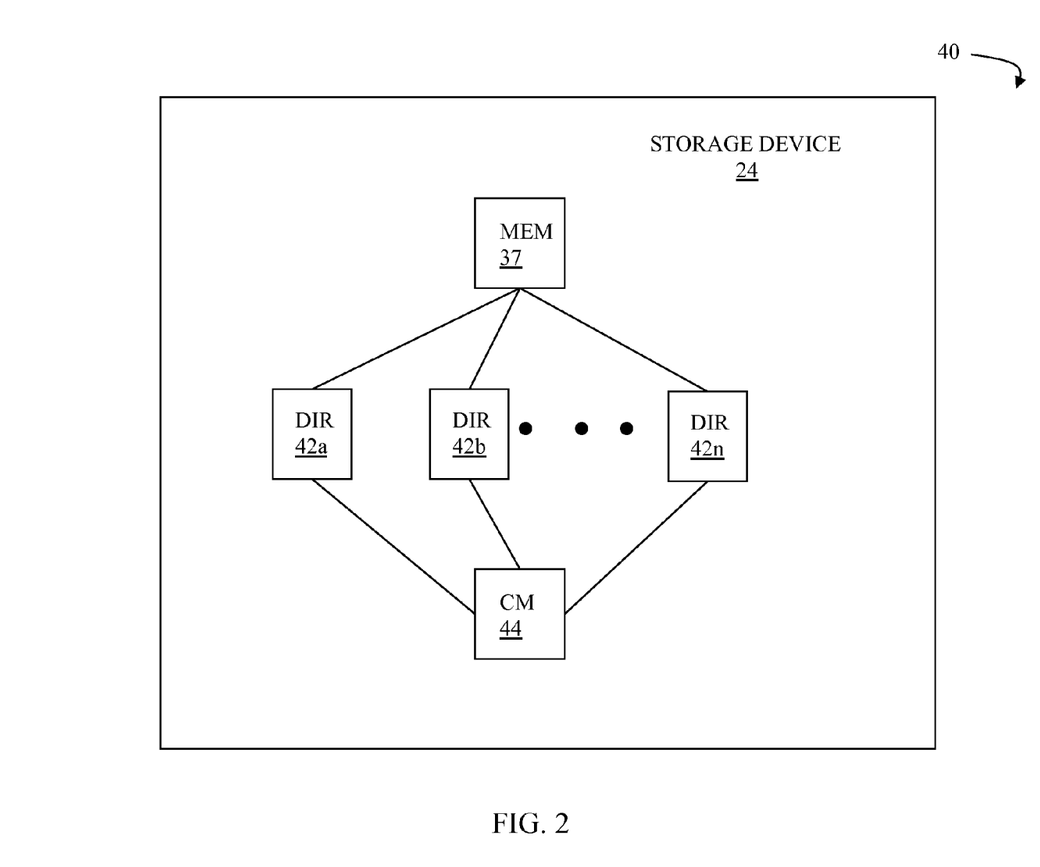
FIG. 2 is a schematic diagram illustrating an embodiment of the storage device where each of a plurality of directors are coupled to the memory.

FIG. 2 is a schematic diagram 40 illustrating an embodiment of the storage device 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 26. The CM 44 may be implemented using conventional MUX/router technology where a sending one of the directors 42a-42n provides an appropriate address to cause a message and/or data to be received by an intended receiving one of the directors 42a-42n. Some or all of the functionality of the CM 44 may be implemented using one or more of the directors 42a-42n so that, for example, the directors 42a-42n may be interconnected directly with the interconnection functionality being provided on each of the directors 42a-42n. In addition, a sending one of the directors 42a-42n may be able to broadcast a message to all of the other directors 42a-42n at the same time.

In some embodiments, one or more of the directors 42a-42n may have multiple processor systems thereon and thus may be able to perform functions for multiple directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage device 24 may be provided as one or more director boards having CPUs, memory (e.g., DRAM, etc.) and interfaces with Input/Output (I/O) modules.

Figure 3:
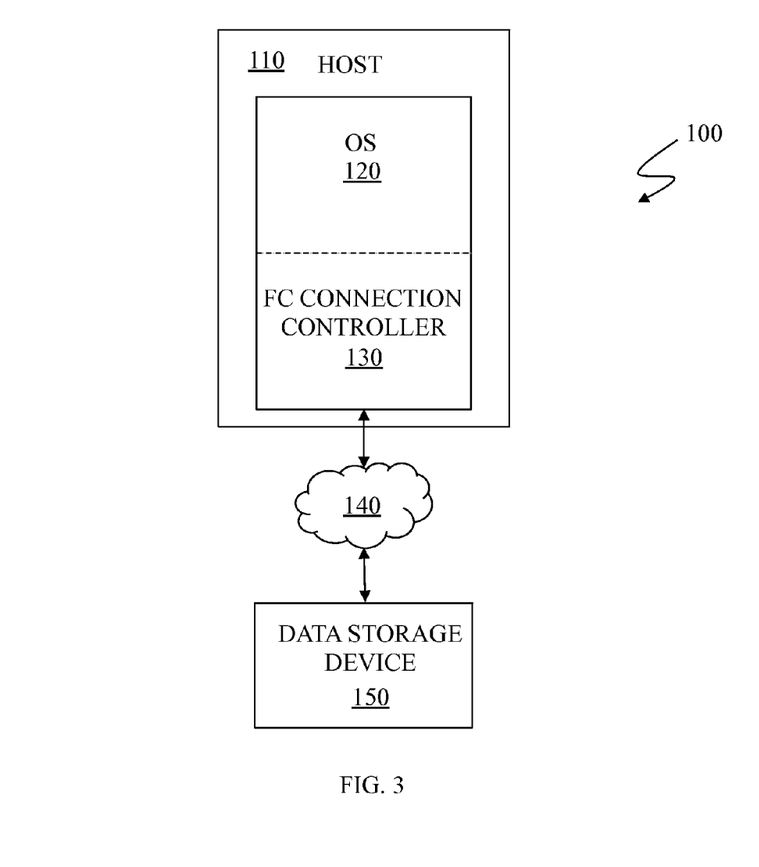
FIG. 3 is a schematic illustration showing a system with a FICON connection between a host and a data storage device according to an embodiment of the system described herein.

FIG. 3 is a schematic illustration showing a system 100 with a FICON connection controller 130 for providing FICON connection between a host 110 and a data storage device 150 according to an embodiment of the system described herein. In an embodiment, the host 110 may be a computer running Linux, z/OS or some other appropriate operating system 120. The I/O processing on the host 110 may operate with the FICON connection controller 130 to enable I/O operations with the data storage device 150. The FICON connection controller 130 may send and receive data to and from the data storage device 140 using a remote connection mechanism 140, that may include a network (such as the Internet, and appropriate connection thereof). The data storage device 150 may include physical storage volumes and/or logical volumes, such as EMC Corporation's Symmetrix data storage facility. The FICON connection controller 130 may act as an I/O subsystem providing FICON communication capability. The data storage device 150 may include features and/or components enabling the Fibre channel communication with the host 110. For a discussion of features and implementations of FICON systems and suitable Fibre channel protocols operating therewith on z/Architecture computing systems, reference is made to J. Entwistle, "IBM System z10 FICON Express8 FCP Channel Performance Report," Technical paper, August 2009, 27 pp., which is incorporated herein by reference.

It is noted that various components of the system 100 may be emulated. For further discussion of emulation of I/O computing components, particular Fibre Channel connection components, reference is made to U.S. patent application Ser. No. 14/133,852 to Jones et al., filed Dec. 19, 2013, entitled "Virtual I/O Hardware" and U.S. patent application Ser. No. 12/215,984 to LeCrone et al., filed Jun. 8, 2008, entitled "I/O Fault Injection Using Simulated Computing Environments," which are both incorporated herein by reference. Accordingly, in various embodiments, the system described herein provides for use of a channel emulator to emulate data transfer paths in I/O operations, and in which the channel emulator may simulate a host channel to provide I/O connectivity with an I/O device and may provide for the I/O connectivity using different channel protocols.

The connection mechanism 140 may include an Internet connection and/or possibly some other types of connection(s). In an embodiment herein, the connection mechanism 140 may be directly incompatible with a FICON connection. The incompatibility may be hardware incompatibility, software incompatibility, or both. Such connection mechanism 140 may not support a direct FICON connection but, instead, rely on a FICON emulator (and/or other emulator(s)) for providing data in an appropriate format. It is further noted that where FICON emulation is being performed, the data storage device 150 may include or be coupled to a FICON emulator portion that may send and receive data to and from the connection mechanism 140 and also emulates a Fibre Channel FC0 physical layer for the benefit of the data storage device 150. Thus, in such case involving emulation, both the host 110 and the data storage device 150 may operate as if the devices 110, 150 were communicating using a FICON hardware connection.

In an embodiment, the system described herein may be used with IBM's z High Performance FICON (zHPF) transport mode protocol implementation. zHPF enhances z/Architecture and FICON interface architecture to improve data transfer processing. In z/OS, standard FICON architecture operates with the command mode protocol, and a zHPF architecture operates with the transport mode protocol.

zHPF provides a Transport Control Word (TCW) that facilitates the processing of an I/O request by the channel and the controller. The TCW enables multiple channel commands to be sent to the controller as a single entity (instead of being sent as separate commands as in a FICON channel command word (CCW)). The channel no longer has to process and keep track of each individual CCW. The channel forwards a chain of commands to the controller for execution. zHPF capable channels may support both FICON and zHPF protocols simultaneously. For a more detailed discussion of zHPF, reference is made, for example, to C. Cronin, "IBM System z10 I/O and High Performance FICON for System z Channel Performance," Technical paper, IBM Corporation, Jan. 28, 2009, 33 pp., which is incorporated herein by reference.

For the system described herein, I/O operations for relatively large amounts of data are subdivided into a plurality of I/O operations, each for a subset of the data. Each of the plurality of I/O operations may then be executed in parallel. If multiple parallel pathways exist between the host and the target device, the plurality of I/O operations may be more efficient (complete faster) than a single I/O operation for all of the data at the same time. The system described herein relies on parallel pathways between the host and an I/O target device, which could either be a local storage device like the storage device 24 shown in FIG. 1, or could be a remote storage device, like the remote storage derive 26 also shown in FIG. 1. The system described herein may subdivide I/O operations in a way that does not adversely impact or require modifications of any applications running on the host 22.

Figure 4:
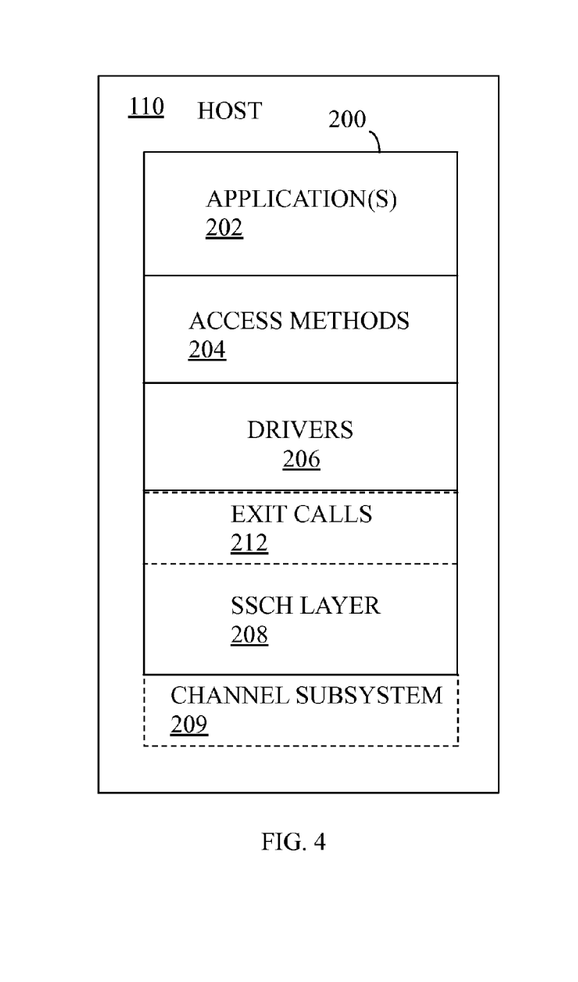
FIG. 4 is a schematic illustration showing software layers in a host according to an embodiment of the system described herein.

Referring to FIG. 4, the host 110 is illustrated with software 200 having an application(s) layer 202, an access methods layer 204, a drivers layer 206, an SSCH layer 208, a channel subsystem layer 209, and an exit calls layer 212. The application(s) layer 202 includes one or more software applications that run on the host 110. The access methods layer 204 includes I/O routines (e.g., read, write, open, etc.) that are used by applications in the application(s) layer 202 in connection with performing I/O operations. Software in the application(s) layer 202 calls specific routines in the access methods layer 204 to access data on a storage device coupled to the host.

The I/O routines in the access methods layer 204 call driver routines in the drivers layer 206 that perform lower-level device specific operations that depend upon the specific type of I/O device and the type of connection thereto. For example, a first driver for a Symmetrix storage device coupled to the host 110 by a FICON connection may be different than a second driver used for a different type of non-volatile storage device coupled to the host 110 using a different type of connection. Note, however, that an application in the application layer 202 may call the same routine (e.g., read) in the access layer 204 irrespective of the physical hardware (and connection there) used for the data, but that the routine in the access layer 204 that is called may call different routines in the drivers layer 206, depending upon a specific configuration/hardware of the system.

The SSCH layer 208 includes routines that perform low-level operations that make calls to the channel subsystem layer 209 to directly control the hardware used for I/O operations, including any storage devices and channels used from transferring data between the host 110 and the storage devices. Routines in the drivers layer 206 call routines in the SSCH layer 208 to perform hardware operations and to transfer data to and from the host 110 and to exchange status and control information to facilitate control of the I/O hardware.

The exit calls layer 212 provides a mechanism for inserting customized processing between the drivers layer 206 and the SSCH layer 208. For any of the routines in the drivers layer 206, it is possible to provide code for the exit layer 212 that is called when a corresponding routine in the drivers layer 206 exits just prior to calling code in the SSCH layer 208. For example, it is possible to provide code in the exit layer 212 that is called in connection with a particular read operation of a specific I/O device by inserting code in the exit layer 212 that is called when the driver for the particular read operation is being called. Thus, a possible sequence of operations is that a routine in the access methods layer 204 invokes the particular read operation in the drivers layer 206 which in turn evokes special processing in the exit layer 212 prior to making any calls to the SSCH layer 208. The exit layer 212 is used in connection with the system described herein, as explained in more detail below.

Figure 5:
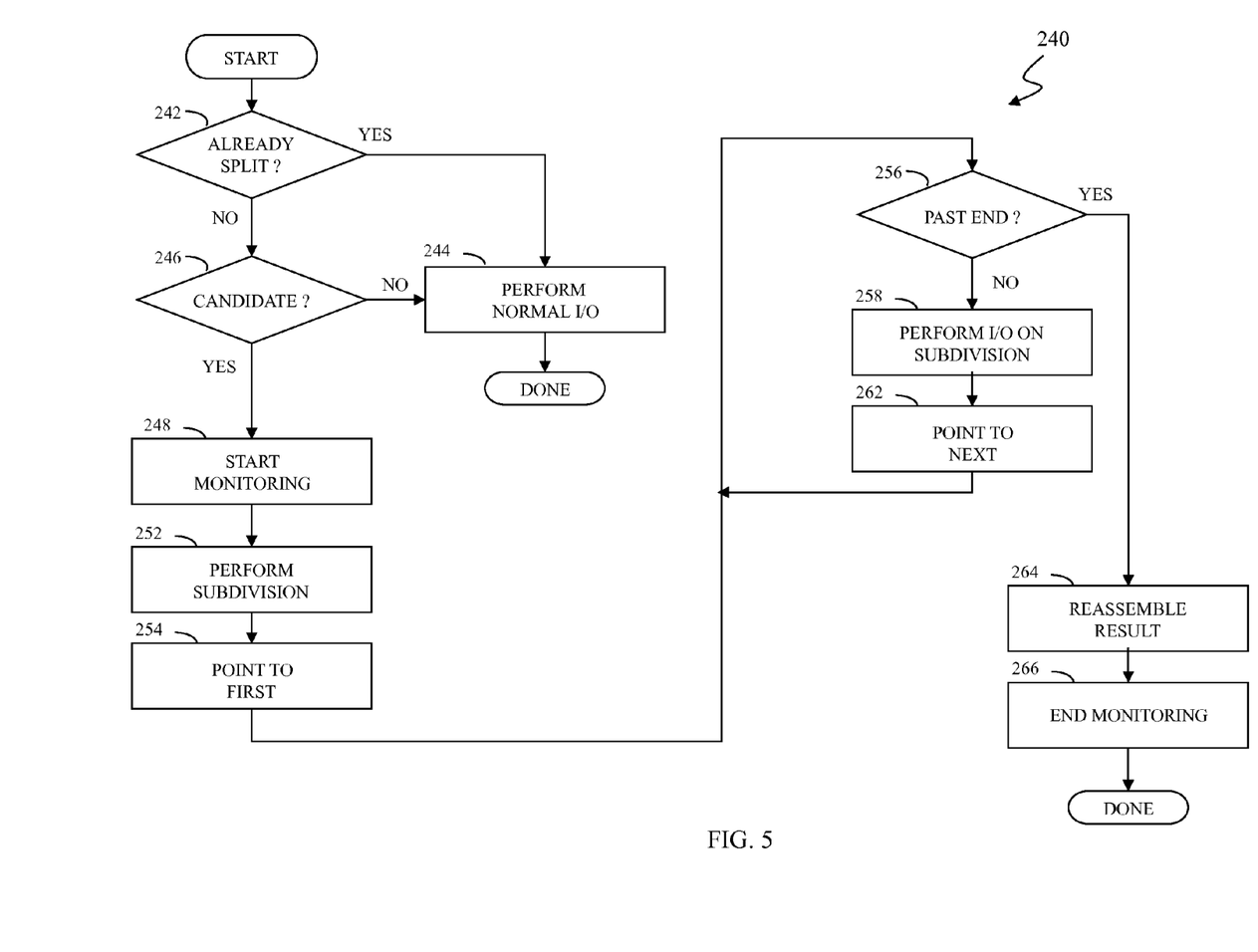
FIG. 5 is a flow diagram illustrating processing performed in connection with possibly subdividing an I/O operation according to an embodiment of the system described herein.

Referring to FIG. 5, a flow diagram 240 illustrates processing performed by software in the exit layer 212 used in connection with disk storage control, read, and write operations. In an embodiment herein, software is provided in the exit layer 212 to provide special processing in connection with storage device read and write calls. Generally, read and write calls that transfer a relatively large (multitrack) amount of data may be subdivided into a plurality of calls that are invoked in parallel and that access different subsets of the data. For example, a read call that reads track number 101 through track number 200 may be subdivided into a first call that reads track number 101 through track number 125, a second call that reads track number 126 through track number 150, a third call that reads track number 151 through track number 175, and a fourth call that reads track number 176 through track number 200. The first, second, third, and fourth calls may be invoked in parallel, which is beneficial in systems that support multi-channel parallel I/O operations. In such systems, it is possible that multiple calls to access smaller increments of data may be completed faster than a single call to access all of the data. In an embodiment herein, a track may contain approximately 50 k bytes of data, although the system may operate with larger or smaller track sizes.

Processing begins at a first step 242 where it is determined if the data being accessed has already been subdivided. In an embodiment herein, a data access operation is subdivided only one time, at most. Thus, for example, if a one hundred track read operation is first subdivided into two fifty track read operations, the resulting fifty track read operations would not be further subdivided. The test at the step 242 may be facilitated by a flag (or similar) that is set for access operations that are a result of a subdivision of a larger access operation. If it is determined at the step 242 that a particular access operation is a result of a previous subdivision, then control transfers from the test step 242 to a step 244 where a normal I/O operation is performed (i.e., conventional I/O processing that would occur if there were no software provided in the exit layer 212 for access operations). Following the step 244, processing is complete.

If it is determined at the test step 242 that the particular access operation is not a result of a subdivision of a previous access operation, then control transfers from the test step 242 to a test step 246 where it is determined if the access operation is a candidate for being subdivided into a plurality of I/O operations for different subsets of the data. The determination at the step 246 is described in more detail elsewhere herein, but may include a determination of whether the access operations accesses multiple track of data (including partial tracks) and whether it is expected that subdividing the access operation will result in an overall improvement of performance. If it is determined at the step 246 that the current access operation is not a candidate for being subdivided, then control transfers from the test step 246 to the step 244, described above, where a normal I/O operation is performed. Following the step 244, processing is complete.

If it is determined at the step 246 that the current access operation is a candidate for being subdivided, then control transfers from the test step 246 to a step 248 where performance monitoring is initiated for the operation. In an embodiment herein, performance monitoring of access operations that are subdivided is used in connection with determining whether to perform subdividing of subsequent access operations. For example, if the performance monitoring determines that subdividing access operations are generally resulting in less efficient I/O throughput (i.e., I/O operations are taking longer), then subsequent I/O operations are less likely to be subdivided.

Following the step 248 is a step 252 where the number of subdivided operations is determined. Note that there may be many ways to subdivide a large I/O operation. For example, a one hundred track read operation may be subdivided into two fifty track read operations, five twenty track read operations, twenty five track read operations, etc. The processing performed at the step 252 is described in more detail elsewhere herein.

Following the step 252 is a step 254 where an iteration pointer that iterates through the plurality of access operations that are the result of subdividing is set to point to the first of the plurality of operations. Following the step 254 is a test step 256 where it is determined if the iteration pointer points past the end of the plurality of access operations (i.e., if all of the access operations have been processed). If not, then control transfers from the test step 256 to a step 258 where a particular access operation indicated by the pointer is processed. For example, if the initial access operation is a read of one hundred tracks of data that is subdivided into four read operations of twenty-five tracks each, then the processing at the step 258 performs processing for one of the twenty-five track read operations for the subdivided access operation indicated by the iteration pointer. In an embodiment herein, the operation at the step 258 is performed by making a call to an appropriate routine in the driver layer 206 which will result in a corresponding call to the SSCH layer 208 (at the step 244, described above). Following the step 258, control transfers to a step 262 where the iteration pointer is incremented. Following the step 262, control transfers back to the step 256, discussed above, where it is determined if all of the plurality of access operations have been processed.

If it is determined at the test step 256 that all of the plurality of access operations have been processed, then control transfers from the test step 256 to a step 264 where the result of all of the subdivided access operations is reassembled to simulate an appropriate result for the initial I/O operation that was subdivided. For example, if the initial I/O operation was a read of one hundred tracks of data that was subdivided into ten access operations to read ten tracks each, the result of the ten separate read operations is reassembled at the step 264 to be a single result that would have been returned after reading one hundred tracks in a single I/O operation. Note that, since the step 258 may be performed by calling an appropriate routine in the driver layer, the step 264 may wait for completion of all of those calls (i.e., all of the I/O operations to complete) in order to be able to reassemble the results of those calls at the step 264. Following the step 264 is a step 266 where performance monitoring is ended. Following the step 266, processing is compete.

Figure 6:
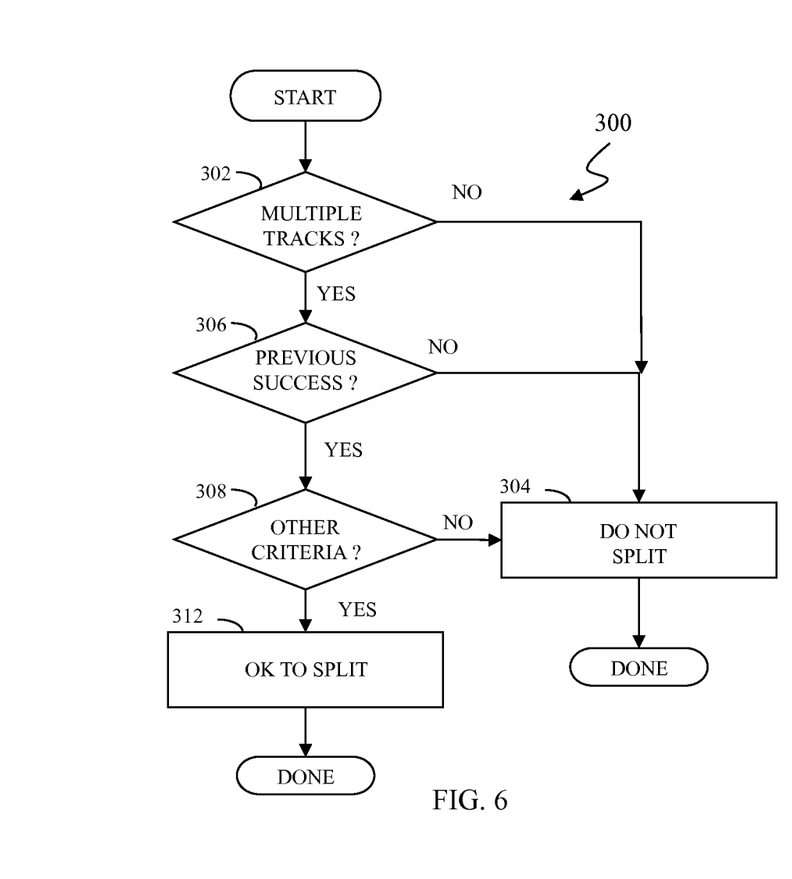
FIG. 6 is a flow diagram illustrating determining whether to subdivide an I/O operation according to an embodiment of the system described herein.

Referring to FIG. 6, a flow diagram 300 illustrates in more detail processing performed at the step 244, described above, where the system determines whether a particular I/O operation is a candidate to be subdivided into a plurality of I/O operations, each for a different portion of the data. Processing begins at a first test step 302 where the system determines if the I/O operation being examined is for a plurality of tracks (more than one track). In an embodiment herein, only I/O operations for multiple tracks are subdivided. Of course, in other embodiments, it may be possible to subdivide an I/O operation for a single track (e.g., for multiple blocks or records), but in that case, it may be useful to also coordinate with the storage device in instances where the storage device may automatically serialize (concatenate) different I/O operations for the same track. If it is determined at the test step 302 that an I/O operation is not for a plurality of tracks, then control transfers from the test step 302 to a step 304 where an indication (e.g., a flag) is set to cause the I/O operation to not be subdivided. Following the step 304, processing is complete.

If it is determined at the test step 302 that the I/O operation is for a plurality of tracks, then control transfers from the test step 302 to a test step 306 where it is determined if previous subdivisions have resulted in I/O efficiencies. In an embodiment herein, the system monitors whether subdividing I/O operations results in the I/O operations being more efficient (taking less time). See, for example, the steps 248, 266, described above. Note that subdividing I/O operations may become inefficient for any number of reasons, including limitations on the number of parallel I/O routes and overhead associated with subdividing the I/O operations. In an embodiment herein, the system may measure past efficiency according to a decaying weighting algorithm, where most recently monitored I/O subdivision operations are given greater weight. Thus, the effects of past inefficiencies are diminished as time passes. Determining performance/efficiency of splitting the data is discussed in more detail elsewhere herein. If it is determined at the step 306 that previous I/O subdivision operations have not provided sufficient I/O efficiencies, then control transfers from the step 306 to the step 304, discussed above, where an indication is set to cause the I/O operation to not be subdivided. Following the step 304, processing is complete.

If it is determined at the test step 306 that previous subdivisions have resulted in I/O efficiencies, then control transfers from the test step 306 to a test step 308 where other criteria is applied to determine if an I/O operation should be subdivided. The other criteria could be any characteristic of the I/O operation and/or system, including an identity of the calling process or application. That is, in some embodiments, some applications/processes may be configured to be more likely to be subdivided than others. Another criteria could be a size of the I/O operation, where operations involving more data are more likely to get subdivided than operations involving less data. Another criteria could include an identity of a destination volume, a time of day, a particular host id, a particular application or set of applications, particular dataset(s), extents, tracks, records/blocks, etc. As discussed in more detail elsewhere herein, the determination at the step 308 may include balancing criteria that include the criteria discussed above and other factors such as available resources and may include making tradeoffs between conflicting criteria. If it is determined at the step 308 that the other criteria indicate that the I/O operation should not be subdivided, then control transfers from the step 308 to the step 304, discussed above, where an indication is set to cause the I/O operation to not be subdivided. Following the step 304, processing is complete. Alternatively, if it is determined at the step 308 that the other criteria indicates that the I/O operation should be subdivided, then control transfers from the step 308 to a step 312 where an indication is set to cause the I/O operation to be subdivided. Following the step 312, processing is complete.

Figure 7:
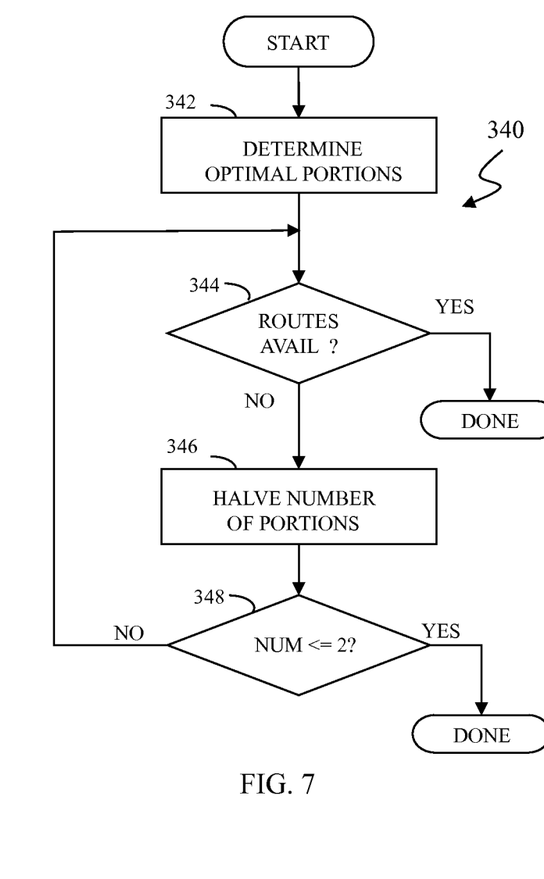
FIG. 7 is a flow diagram illustrating determining a number of subdivisions for an I/O operation according to an embodiment of the system described herein.

Referring to FIG. 7, a flow diagram 340 illustrates in more detail processing performed at the step 252 in the flow diagram 240 of FIG. 5 where an I/O operation is subdivided. Processing begins at a first step 342 where an optimal number of subdivisions is determined based on, for example, a table lookup. Other criteria could include a known optimal size or range of sizes for subdivisions, a formula based, in part, on performance of previous subdivisions, etc. Following the step 342 is a test step 344 where it is determined if there are a sufficient number of parallel I/O routes to handle the number of the subdivisions determined at the step 342 at the same time. For example, if the step 342 indicated that sixteen subdivisions is optimal in a particular situation, but there are only ten parallel I/O routes available for use, then the test at the step 344 would determine that there are not enough I/O routes. Note that, in some embodiments, it may be acceptable to provide a number of subdivisions that exceeds the number of available I/O routes.

If it is determined at the step 344 that enough parallel I/O routes exist, then processing is complete. Otherwise, control transfers from the test step 344 to a step 346 where the number of subdivisions is halved (with appropriate rounding). Following the step 346 is a test step 348 where it is determined if the number of desired subdivisions (after halving) is less than or equal to two. If so, then processing is complete. If not, then control transfers from the test step 348 back to the test step 344 for another iteration.

In some cases, it may be useful to provide a planning tool that helps select candidates for applying I/O subdivision as discussed herein. This may be especially true in instances where a system does not have enough resources to subdivide all I/O operations and/or where clearly some applications/datasets are more critical than others. For example, a system may combine a plurality of relatively low priority back office applications (e.g., data collection and tabulation) with relatively high priority applications that require rapid response (e.g. applications that interact directly with customers). In such a case, it may be useful to have a planning tool to analyze the effects of subdividing certain I/O operations.

Figure 8:
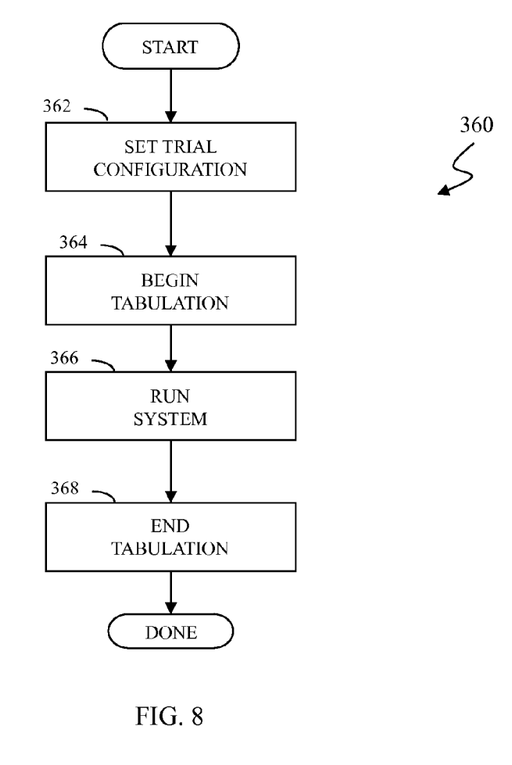
FIG. 8 is a flow diagram illustrating use of a planning tool according to an embodiment of the system described herein according to an embodiment of the system described herein.

Referring to FIG. 8, a flow diagram illustrates using a planning tool to analyze the effects of subdividing I/O operations in a system. Processing begins at a first step 362 where a trial configuration is provided. The trial configuration may indicate which applications/datasets/volumes are to be selected for possibly subdividing I/O operations. In some cases, applications/user with a service level agreement may be preferred. The configuration may include any other information (e.g., thresholds) that may be used during runtime to determine whether to subdivide an I/O operation. Following the step 362 is a step 364 where the system begins tabulation. In an embodiment, running the planning tool does not change any I/O operations. Instead, the planning too tabulates the expected results if the system were to perform I/O subdivision. For example, the planning tool may determine that a particular I/O operation will take x msec less time if the I/O operation had been subdivided according to the processing described herein. Following the step 364 is a step 366 where the system is run in the usual fashion (i.e., in production), except of course that the planning tool is also running and tabulating information. Following the step 366 is a step 368 where tabulation is terminated. Note that the amount of time between the step 364 (begin tabulation) and the step 368 (end tabulation) can be any amount, such as a day (24 hours) or a work day (i.e., 9 am to 5 pm). Following the step 368, processing is complete.

Note that the system described herein may be adapted to work with any operating system. In some cases, the adaptation may include modification of drivers. Note also that the system may be adapted to operating inside the storage device by subdividing I/O requests from host (or similar) devices as the requests are received. In addition, in instances where parallel I/O routes exist between storage devices in connection with RDF transfer, adapting the system to operate inside a storage device may allow the storage device to subdivide I/O operations prior to transferring data to a remote storage device.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of servicing I/O operations initiated by an application running on a host that is coupled to a storage device, comprising:
   selecting a portion of original I/O operations initiated by the application based on a first set of criteria;
   determining whether to subdivide each of the portion of original I/O operations that are selected according to a second set of criteria different than the first set of criteria, wherein the second set of criteria is respectively applied to each I/O operation of the portion of original I/O operations; and
   the host converting each of the original I/O operations selected for subdivision into a plurality of subdivided I/O operations for different portions of data for a corresponding one of the original I/O operations, using customized processing that is called in connection with exiting I/O driver routines that are called by the application, wherein converting each of the original I/O operations selected for subdivision into a plurality of subdivided I/O operations is performed external to the application by a routine in a first layer that is between a driver layer and a second layer that directly controls hardware that communicates with the storage device.

2. A method, according to claim 1, wherein the first set of criteria includes whether the I/O operations are for multiple tracks of data.

3. A method, according to claim 1, wherein the second set of criteria includes determining whether previous subdivision operations provide a measured amount of performance improvement.

4. A method, according to claim 3, wherein performance of subdivided I/O operations is monitored.

5. A method, according to claim 1, wherein a number of subdivided I/O operations is limited by a number of available parallel I/O routes.

6. A method, according to claim 1, wherein results of the subdivided I/O operations are reassembled to provide a result to the I/O driver routines.

7. A method, according to claim 1, wherein an original I/O operation is subdivided according to different tracks, each corresponding subdivided I/O operation being for a particular one of the tracks.

8. A method, according to claim 1, wherein a subdivided I/O operation is prevented from being further subdivided.

9. A method, according to claim 1, further comprising:
   using a planning tool to predict an effect of subdividing I/O operations.

10. A non-transitory computer-readable medium containing software that services I/O operations initiated by an application running on a host that is coupled to a storage device, the software comprising:
    executable code that selects a portion of original I/O operations initiated by the application based on a first set of criteria;
    executable code that determines whether to subdivide each of the portion of original I/O operations that are selected according to a second set of criteria different than the first set of criteria, wherein the second set of criteria is respectively applied to each I/O operation of the portion of original I/O operations; and
    executable code on the host that converts each of the original I/O operations selected for subdivision into a plurality of subdivided I/O operations for different portions of data for a corresponding one of the original I/O operations, using customized processing that is called in connection with exiting I/O driver routines that are called by the application, wherein converting each of the original I/O operations selected for subdivision into a plurality of subdivided I/O operations is performed external to the application by a routine in a first layer that is between a driver layer and a second layer that directly controls hardware that communicates with the storage device.

11. A non-transitory computer-readable medium, according to claim 10, wherein the first set of criteria includes whether the I/O operations are for multiple tracks of data.

12. A non-transitory computer-readable medium, according to claim 10, wherein the second set of criteria includes determining whether previous subdivision operations provide a measured amount of performance improvement.

13. A non-transitory computer-readable medium, according to claim 12, wherein performance of subdivided I/O operations is monitored.

14. A non-transitory computer-readable medium, according to claim 10, wherein a number of subdivided I/O operations is limited by a number of available parallel I/O routes.

15. A non-transitory computer-readable medium, according to claim 10, wherein results of the subdivided I/O operations are reassembled to provide a result to the I/O driver routines.

16. A non-transitory computer-readable medium, according to claim 10, wherein an original I/O operation is subdivided according to different tracks, each corresponding subdivided I/O operation being for a particular one of the tracks.

17. A non-transitory computer-readable medium, according to claim 10, wherein a subdivided I/O operation is prevented from being further subdivided.

* * * * *

UNITED STATES PATENT AND TRADEMARK OFFICE
CERTIFICATE OF CORRECTION

PATENT NO.         : 9,990,137 B1
APPLICATION NO.    : 14/674617
DATED              : June 5, 2018
INVENTOR(S)        : Douglas E. Lecrone et al.

Page 1 of 1

It is certified that error appears in the above-identified patent and that said Letters Patent is hereby corrected as shown below:

On the Title Page

The Applicant should read:
(71) Applicant: EMC IP Holding Company LLC, Hopkinton, MA (US)

Signed and Sealed this
Seventh Day of August, 2018

Andrei Iancu
*Director of the United States Patent and Trademark Office*